United States Patent [19]

Halkio

[11] Patent Number: 5,917,886
[45] Date of Patent: Jun. 29, 1999

[54] METHOD AND EQUIPMENT FOR MONITORING THE CONDITION OF AN INTERCONNECTION NETWORK

[75] Inventor: Jari Halkio, Helsinki, Finland

[73] Assignee: Nokia Telecommunications Oy, Espoo, Finland

[21] Appl. No.: 08/750,095

[22] PCT Filed: May 22, 1995

[86] PCT No.: PCT/FI95/00278

§ 371 Date: Nov. 25, 1996

§ 102(e) Date: Nov. 25, 1996

[87] PCT Pub. No.: WO95/32569

PCT Pub. Date: Nov. 30, 1995

[30] Foreign Application Priority Data

May 25, 1994 [FI] Finland ................................. 942429

[51] Int. Cl.⁶ .......................... H04M 11/04; H04M 15/00
[52] U.S. Cl. .............................. 379/37; 379/137; 379/139
[58] Field of Search .................................. 379/36, 37, 12, 379/19, 20, 22, 113, 124, 137, 139, 93.05, 93.07, 100.12; 340/825.03

[56] References Cited

FOREIGN PATENT DOCUMENTS 4-35558  2/1992  Japan .

*Primary Examiner*—Paul Loomis
*Assistant Examiner*—George Eng
*Attorney, Agent, or Firm*—IP Group of Pillsbury Madison & Sutro, LLP

[57] ABSTRACT

A method and equipment for monitoring the condition of an interconnecting interfaces, in which counters, specific to each interconnection interface are provided. Each counter is preset to a predetermined initial value, which is changed on the basis of the result of a monitoring cycle and at predetermined intervals. An alarm is given if the counter reaches or crosses a predetermined threshold value.

9 Claims, 2 Drawing Sheets

| K | BIN | DEC |
|---|---|---|
| K=1 | 1001111111111001<br>− 100111111111100<br>100111111111101 | =40 953<br>=20 476<br>=20 477 |
| K=2 | 1001111111111001<br>− 10011111111110<br>111011111111011 | =40 953<br>=10 238<br>=30 715 |

METHOD AND EQUIPMENT FOR MONITORING THE CONDITION OF AN INTERCONNECTION NETWORK

BACKGROUND OF THE INVENTION

This invention relates to a method for monitoring the condition of an interconnection network, in which method monitoring cycles are carried out for checking the condition of interconnection interfaces, a counter specific to each interconnection interface is provided, and the counter is preset to a predetermined initial value. The invention further relates to monitoring equipment for an interconnection network, this equipment comprising a monitoring unit for checking the condition of interconnection interfaces, means for giving an alarm, and a counter specific to each interconnection interface.

This invention is related with monitoring and maintenance of interconnection networks, such as interconnections connected to a telephone exchange, or connections used for telecommunication. The function of the maintenance systems for interconnection networks is to monitor the interconnections connected with the exchanges and manage the failure situations occurring in them. When a monitoring system detects a failure, an alarm is given of it. The publication ITU-T Recommendations Q.542 (International Telecommunications Union) sets forth recommendations about how a monitoring system should react to various failure situations detected in an interconnection network.

A maintenance system must give an alarm when a certain number of alarms occur in an interconnection within a certain time. Occasional momentary failures occurring in interconnections must not cause an alarm. Therefore, the monitoring system must be capable of filtering alarms in accordance with the ITU-T recommendations. The aim is thus a delayed reaction, like the hysteresis phenomenon.

A solution is previously known, in which false alarms are avoided by storing interconnection interface-specific monitoring data in a buffer; i.e., each time when the operation of a certain interconnection interface is checked, the result of the check is stored in a buffer. Thus, an interconnection interface-specific list of the results of monitoring is formed in the buffer. An alarm is given only in the case where a failure is detected in a certain interconnection interface during several monitoring cycles. The weakness of this prior art method is that it requires a very large memory capacity and resources, such as processor time for managing and utilizing the data stored in the buffer. The more complex the filtering conditions are to be followed in the system, and the more interconnection interfaces are to be monitored in the system, the more resources are consumed. The need of resources is due to the fact that the monitoring system must read the information (a list) on every single interconnection interface from the buffer during a monitoring cycle, after which the information on the single interconnection interface must be interpreted on the basis of the set filtering condition, and only after this, the monitoring system may conclude whether it should give an alarm relating to the interconnection interface in question.

SUMMARY OF THE INVENTION

The object of this invention is to solve the above mentioned problem and provide a method for monitoring the condition of an interconnection network. This object is achieved with a method of the invention, which is characterized in that the value of the counter is changed on the basis of the result of a monitoring cycle, as well as at predetermined intervals depending on the value indicated by the counter, and an alarm is given when the counter reaches or exceeds a predetermined threshold value.

The invention is based on the idea that when the condition of the interconnection interfaces is monitored in a way known per se, and when the results are registered with the aid of an interconnection interface-specific counter, the filtering of the alarms relating to the interconnection interface in question may be implemented in a very simple and reliable way by using the interconnection interface-specific counter without this requiring a particularly large memory capacity or resources. Since only one counter is required for each interconnection interface, the need for memory capacity is minimized. Furthermore, the monitoring system requires smaller resources than conventionally were needed before for filtering the alarms, as the filtering is carried out while the counter is updated, in which case the condition of each interconnection line may be immediately interpreted on the basis of the reading indicated by the counter. The most important advantages of the method of the invention thus are that with the aid of the method, an optimal filtering condition may be achieved with small resources and a small memory capacity. Thus, the system in which the method is applied becomes relatively simple, so it may easily be placed in the vicinity of the equipment.

When the counter used is a 16-bit counter the value of which is reduced by the value that is obtained by shifting the bit pattern corresponding to the present value of the counter to the right as much as indicated by the value of the slow-down coefficient when the result of a check is faulty, and when the value of the counter is increased at predetermined intervals by one when the value in the counter deviates from the initial value, a monitoring method requiring very small resources and a small memory capacity is accomplished, which method may be preferably applied, e.g. by means of a computer program and used for monitoring the condition of an interconnection interface so that false alarms are avoided.

The invention further relates to monitoring equipment with which the method of the invention may be applied. The equipment of the invention is characterized in that the monitoring unit is adapted to change the value of the counter at predetermined intervals depending on the value indicated by the counter, and as a response to the result of a check, and that the alarm means are adapted to give an alarm when the value of the counter reaches or exceeds a predetermined threshold value.

BRIEF DESCRIPTION OF THE DRAWINGS

In the following, the invention will be described more detailed by way of an example with the aid of a preferred embodiment of the equipment of the invention, with reference to the attached drawings, in which.

DETAILED DESCRIPTION

Figure 1:
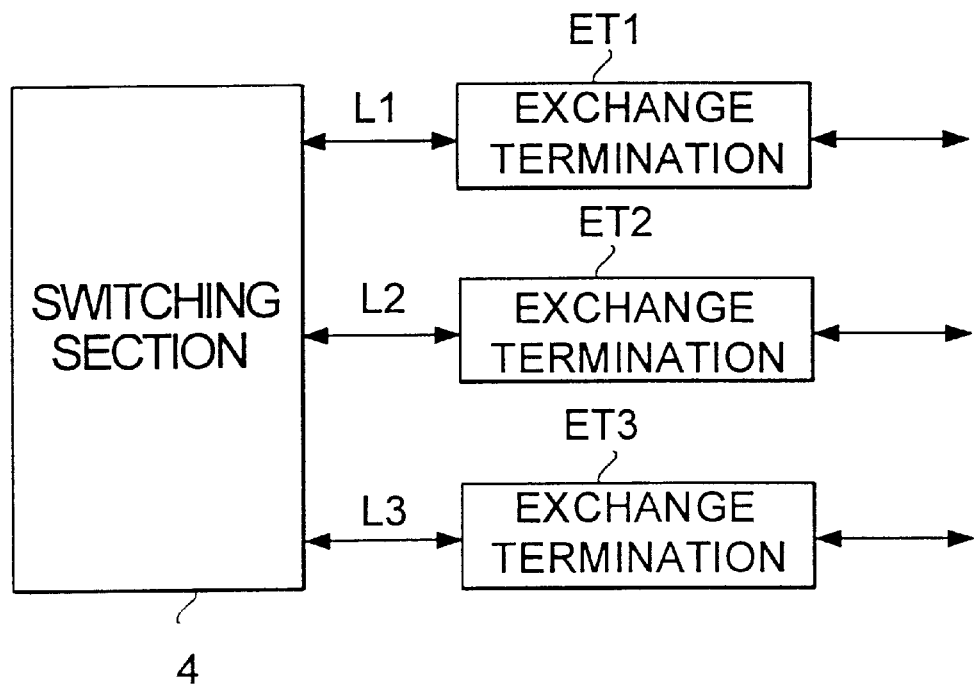
FIG. 1 is a block diagram illustrating the interconnection interfaces of a telephone exchange.

FIG. 1 shows a block diagram of interconnection interfaces L1, L2 and L3 of a telephone exchange. In FIG. 1, three exchange terminations ET1, ET2 and ET3 (Exchange Termination) have been connected to the telephone exchange, via which terminations the exchange communicates with other exchanges of the network. Interconnections connected with the exchange terminations are time-division PCM (Pulse Code Modulation) linkages, i.e. digital interexchange connections. The capacity of one interconnection is divided into 32 time-slots, one of which is reserved for monitoring, and the remaining 31 time-slots are freely available for call switching and signalling, among other things.

The monitoring system shown in FIG. 1 must be capable of monitoring the operation of interconnection interfaces and managing the failure situations detected in them. In other words, the monitoring system must be capable of managing alarms relating to interconnection interfaces L1, L2 and L3, among other things. This is carried out in such a way that when the exchange terminations detect in the interconnections failure situations in accordance with ITU-T specification Q.542, they generate a binary word indicating the failure situation, which binary word is stored in a certain memory location. The monitoring system, in turn, separately reads during a monitoring cycle the storage locations indicating failure in each interconnection. The monitoring system is thus able to manage several failure reports of various failure situations.

In addition, the monitoring system must be capable of filtering faults detected by it, so that potential occasional malfunctions will not cause alarms to the operator.

Figure 2:
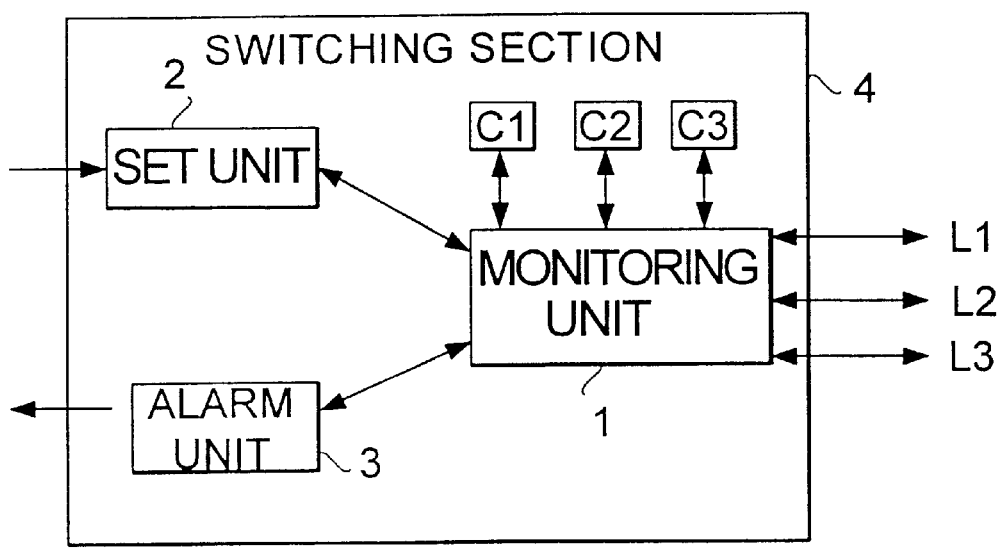
FIG. 2 is a block diagram illustrating the switching section shown in FIG. 1.

FIG. 2 shows a block diagram of the switching section 4 of FIG. 1. Only the parts which relate to the monitoring system and with the aid of which the monitoring system monitors the condition of the interconnection network are shown in FIG. 2. A monitoring unit 1 monitors the condition of interconnection interfaces L1, L2 and L3 and observes the alarms transmitted through them. At certain intervals, the monitoring unit 1 carries out a monitoring cycle during which it checks in a way known per se the condition of each interconnection interface L1, L2 and L3 sequentially. It stores the result of each check to an interconnection interface-specific counter.

FIG. 2 shows three interconnection interface-specific counters C1, C2 and C3, which are maintained by the monitoring unit 1 on the basis of the results of the monitoring of respective interconnection interfaces L1, L2 and L3. The counters are 16-bit memory cells, which are preset at the initial stage in an initial value LA, which, expressed with hexadecimals is e.g. FFFF. If the value of the counter deviates from its initial value LA, the monitoring unit 1 will increase its value by one at predetermined intervals, e.g. in every 16 seconds. During each monitoring cycle, the monitoring unit reduces the value of the counter by the value which is obtained by shifting the bit pattern to the right as much as indicated by the value of the slow-down coefficient (K) (compare FIG. 3), if the result of the monitoring cycle is faulty, i.e. a failure has been detected in the interconnection interface corresponding to the counter in question.

Subsequent to the updating of the counter, the monitoring unit 1 compares the present value of the counter with the alarm value LH indicated by a set unit 2. If the new value of the counter is equal to or less than the alarm value LH, the monitoring unit 1 will give an alarm with the aid of alarm means 3, which preferably transmit the message of the alarm situation to the operator, or indicate the alarm situation in some other way, e.g. with a signal light.

The set unit 2 comprises means with the aid of which the operator may adjust the slow-down coefficient K, as well as the alarm threshold value LH to the desired level. The monitoring unit 1 checks the slow-down coefficient and the alarm threshold value of the set unit during each monitoring cycle.

Figures 3, 4:
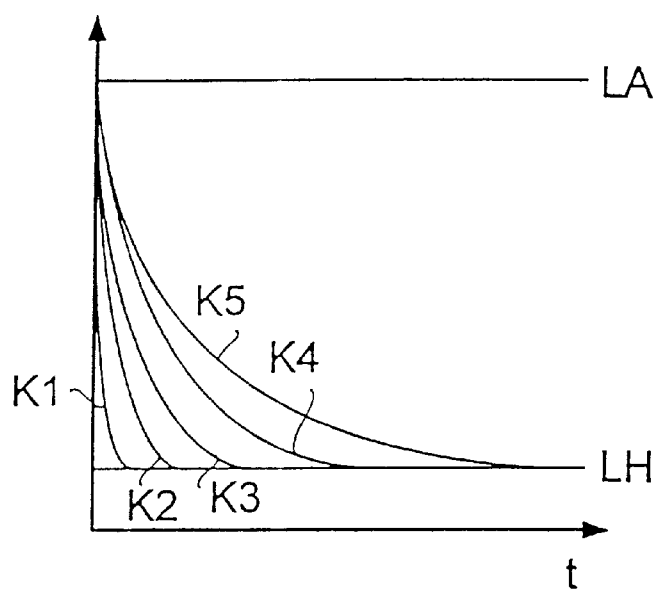
FIG. 3 illustrates reducing the value of the counter.
FIG. 4 illustrates reduction of the value of the counter with different slow-down coefficients.

FIG. 3 illustrates reducing the value of the counter by means of the slow-down coefficient. In FIG. 3, the value of the counter is represented in binary digits (BIN), as well as by means of the decimal number system (DEC). It appears from the table in FIG. 3 that when the slow-down coefficient K=1, the value of the counter is reduced by subtracting from it a value that is obtained by shifting the present bit pattern of the counter one step to the right (in which case the number of bits indicated by the slow-down coefficient is removed from the right). Similarly, when the slow-down coefficient K=2, the value of the counter is reduced by subtracting from it a value that is obtained by shifting the present bit pattern of the counter two steps to the right. It appears from the table in FIG. 3 that the smaller the slow-down coefficient is, the more rapidly the value of the counter will be reduced.

FIG. 4 illustrates the reduction of the value of the counter with different slow-down coefficients. The horizontal axis represents time t and the vertical axis represents the value of the counter. When the counter is initialized, the counter is given a value LA, which is preferably FFFF expressed with hexadecimals. When the value of the counter has been reduced so that it is equal to or less than the alarm threshold value, an alarm is given.

FIG. 4 illustrates the reduction of the value of the counter with five different values of the slow-down coefficient K1–K5, K5 having the highest value. It appears from FIG. 4 that the value of the counter is reduced like a hyperbola depending on the value of the slow-down coefficient. The higher the value has been given to the slow-down coefficient, the more slowly the value of the counter will be reduced. The operator thus has a chance to set a suitable filtering condition for the failures detected by the monitoring unit by changing the value of the slow-down coefficient K and the alarm threshold value LH.

Once the value of the counter has gone below the alarm threshold value LH, the value depending on the slow-down coefficient K will no longer be subtracted from it by the monitoring unit during the monitoring cycles, but a value that will maintain the counter on a predetermined level (below the alarm threshold value LH), although the monitoring unit still increases the value of the counter at predetermined intervals. Thus, by adjusting the set unit, the operator may determine the level on which the counter will remain in a constant failure situation (and how much time the counter requires for exceeding the alarm threshold value LH once the failure is removed).

It should be understood that the above description and the figures associated therewith are only intended to illustrate the present invention. Different variations and modifications will be obvious for persons skilled in the art, without deviating from the scope of protection and the spirit of the invention set forth in the attached claims.

I claim:

1. A method for monitoring the condition of an interconnection network, by carrying out monitoring cycles for checking the condition of a plurality of interconnection interfaces, comprising the steps of:

(a) providing each of the interconnection interfaces with a respective counter which is specific to the respective interconnection interface;

(b) presetting each said counter to a respective predetermined initial value;

(c) checking the condition of each said interconnection interface, in a plurality of monitoring cycles, to obtain respective checking results;

(d) changing the respective existing value of each said counter, on the basis of said checking, providing that a failure of the respective interconnection interface has been detected in the respective monitoring cycle, said changing involving reducing the respective existing value by an amount obtained by shifting a bit-pattern corresponding to the respective existing value as indicated by the respective counter, a number of positions to the right, which number is predetermined by a slow-down coefficient chosen by a user;

(e) changing the respective existing value of each said counter periodically, providing that the respective existing value of the respective counter when a respective periodic occasion for changing occurs, said respective existing value is different from the respective preset predetermined value; and (f) giving an alarm by a respective said counter when the respective value indicated by the respective said counter, as a result of said changing, reaches or crosses a predetermined threshold.

2. The method of claim 1, wherein:

said changing of step (d) involves reducing the respective existing value; and said changing of step (e) involves increasing the respective existing value.

3. The method of claim 1, wherein:

said changing of step (d) involves reducing the respective existing value by an amount having a size which depends on a slow-down coefficient predetermined by a user.

4. The method of claim 1, wherein each said counter is a 16-bit counter.

5. Monitoring equipment for monitoring the condition of an interconnection network, by carrying out monitoring cycles for checking the condition of a plurality of interconnection interfaces, comprising:

(a) a respective counter provided for each of the connection interfaces, each said counter being arranged to be specific to a respective said interconnection interface, each said counter being arranged to be preset to a respective initial value;

(b) a monitoring unit arranged for checking the condition of each said interconnection interface, in a plurality of monitoring cycles, to obtain respective checking results; said monitoring unit being arranged for:

(i) changing the respective value of each said counter, on the basis of said checking, providing that a failure of the respective interconnection interface has been detected in the respective monitoring cycle, wherein said changing involves reducing the respective existing value by an amount obtained by shifting a bit-pattern corresponding to the respective existing value as indicated by the respective counter, a number of positions to the right, which number is predetermined by a slow-down coefficient chosen by a user; and (ii) changing the respective existing value of each said counter periodically, providing that the respective existing value of the respective counter when a respective periodic occasion for changing occurs, said respective existing value is different from the respective preset predetermined value; and (c) an alarm device arranged for giving an alarm by a respective said counter when the respective value indicated by the respective said counter, as a result of said changing, reaches or crosses a predetermined threshold.

6. The monitoring equipment of claim 5, wherein:

said changing which said monitoring unit is arranged to provide according to (b)(i) involves reducing the respective existing value; and said changing which said monitoring unit is arranged to provide according to (b)(ii) involves increasing the respective existing value.

7. The monitoring equipment of claim 5, wherein:

said changing which said monitoring unit is arranged to provide according to (b)(i) involves reducing the respective existing value by an amount having a size which depends on a slow-down coefficient predetermined by a user.

8. The monitoring equipment of claim 5, wherein:

said monitoring equipment is arranged in serving relation to a telephone network for monitoring an interconnection network of the telephone network.

9. The monitoring equipment of claim 5, wherein each said counter is a 16-bit counter.

* * * * *